United States Patent
Bartosch

(10) Patent No.: US 12,281,745 B1
(45) Date of Patent: Apr. 22, 2025

(54) TWIN CAM FOLLOWER

(71) Applicant: Intech Powercore Corporation, Closter, NJ (US)

(72) Inventor: Georg Bartosch, Demarest, NJ (US)

(73) Assignee: Intech Powercore Corporation, Closter, NJ (US)

( * ) Notice: Subject to any disclaimer, the term of this patent is extended or adjusted under 35 U.S.C. 154(b) by 0 days.

(21) Appl. No.: 18/884,336

(22) Filed: Sep. 13, 2024

(51) Int. Cl.
 *F16M 11/08* (2006.01)
 *F16C 13/00* (2006.01)

(52) U.S. Cl.
 CPC ............. *F16M 11/08* (2013.01); *F16C 13/00* (2013.01)

(58) Field of Classification Search
 CPC ......... F16M 11/08; F16C 13/00; A47B 11/00; A47B 2200/02; G01S 7/4817; G01S 17/89
 USPC ....... 108/139, 20, 22, 103, 94, 104, 142, 21; 312/266, 267, 249.2, 305; 248/425, 248/349.1, 346.021, 694, 346.01, 346.02; 211/144; 384/58
 See application file for complete search history.

(56) References Cited

U.S. PATENT DOCUMENTS

| | | | | |
|---|---|---|---|---|
| 1,903,419 A | * | 4/1933 | Keller | A47B 11/00 108/94 |
| 3,265,450 A | * | 8/1966 | Aho | F16C 29/045 384/57 |
| 5,243,434 A | * | 9/1993 | Nodama | F16M 11/18 348/827 |
| 5,735,214 A | * | 4/1998 | Tsuboi | F16C 29/005 384/57 |
| 6,154,956 A | * | 12/2000 | Frohardt | B23Q 1/015 108/142 |
| 6,231,020 B1 | * | 5/2001 | Willson | A47B 11/00 248/922 |

(Continued)

FOREIGN PATENT DOCUMENTS

| | | | | |
|---|---|---|---|---|
| DE | 3706983 A | * | 9/1987 | .............. F16F 1/024 |
| DE | 19529042 A1 | * | 2/1997 | ............ F16C 13/006 |
| EP | 4053431 A1 | | 9/2022 | |

OTHER PUBLICATIONS

Mues, K., "Getting the Right Cam-Follower Bearing", Machine Design, Mechanical & Motion Systems, Feb. 12, 2020 https://www.machinedesign.com/mechanical-motion-systems/article/21122869/getting-the-right-cam-follower-bearing.

(Continued)

*Primary Examiner* — Janet M Wilkens
(74) *Attorney, Agent, or Firm* — FORGE IP, PLLC

(57) ABSTRACT

A cam follower adapted for use in connection with a turntable assembly includes a common support shaft having a longitudinal axis and first and second roller assemblies, each having an outer tire portion and an inner bearing portion. The outer tire portions have curved outer peripheries shaped as truncated spheres, spheroids or ellipsoids, are rotatable about the longitudinal axis independently of one another, and are formed from a polymer material, such as polyimide, polyaryletherketone (PAEK), acetal, cast nylon 12 or cast nylon 6. The outer tire portion of the first roller assembly is adapted to be positioned a first radial distance, and the outer tire portion of the second roller assembly is adapted to be positioned a second radial distance, from the axis of rotation of the turntable assembly, the second radial distance being different than the first radial distance.

19 Claims, 7 Drawing Sheets

(56) References Cited

U.S. PATENT DOCUMENTS

| | | | | |
|---|---|---|---|---|
| 8,882,076 | B2* | 11/2014 | Scelfo | B65D 19/38 |
| | | | | 414/781 |
| 10,088,029 | B1 | 10/2018 | Singh | |
| 10,697,493 | B2 | 6/2020 | Malychok et al. | |
| 11,578,791 | B1* | 2/2023 | Bartosch | F16H 53/08 |
| 2007/0157857 | A1* | 7/2007 | Bottemiller | A47B 11/00 |
| | | | | 108/103 |

OTHER PUBLICATIONS

FR . . . EU Concentric Cam Follower Track Roller Bearing ( (FR22EU FR32EU FR40EU FR52EU FR62EU), Jul. 29, 2024 https://sts-machinery.en.made-in-china.com/product/hZsaNIMAEURe/ China-FR-EU-Concentric-Cam-Follow er-Track-Roller-Bearing-FR22EU-FR32EU . . . .

* cited by examiner

TWIN CAM FOLLOWER

FIELD OF THE INVENTION

The present invention relates generally to a cam follower, and more particularly to a cam follower particularly adapted to for use in connection with supporting a rotating plate, such as a turntable.

BACKGROUND OF THE INVENTION

Cam followers are often used to support generally flat rotating plates, which plates may be circular in cross section or have some other shape. One example of such a rotating plate is a turntable, such as may be used in connection with packaging applications, wherein cardboard packages or the like may be transported between two points. In this type of application, the rotating part of a horizontal turntable is generally rotatable about a vertical axis, and is supported on a plurality of cam followers (which may be spaced, for example, 90 degrees apart, 120 degrees apart, etc.), and which themselves may or may not run on a stationary table surface, typically constructed from additional flat plates. The cam followers are generally carried by shafts that are disposed radially with respect to the vertical axis of rotation of the rotating horizontal plate.

Of course, it should be recognized that the rotating plate need not be a turntable, and need not be disposed horizontally. For example, the rotating plate may comprise part of a necking machine, a liquid filling machine, or the like wherein the rotating plate is disposed vertically and is rotatable about a horizontal axis, or it may be disposed at a plate angle and be rotatable about an axis that is typically normal to that plate angle. Whatever the angle at which the plate is disposed, however, the cam follower(s) is/are carried by shafts that are disposed radially with respect to the axis of rotation of the plate. Thus, while a turntable is discussed herein as an exemplary embodiment of the rotatable plate, it should be recognized that the invention is not limited thereto.

Traditional cam followers are made of metal in order to provide the structural integrity needed to withstand repeated and potentially substantial loads. Metal cam followers, however, suffer from various disadvantages, including the fact that metal cam followers are subject to wear themselves, and also may cause wear of the rotating plate, as a result of continuous and/or repeated contact with the rotating plate. For production machines with moving parts, wear can be a major problem—particularly for traditional metal cam followers, bearings and other parts. Excessive wear requires replacement of the metal cam followers, and eventually even to replacement of the rotating metal plate. Polymer components are a superior alternative in many applications because they avoid metal-to-metal wear while offering additional design freedom to further counteract grease contamination and wear mechanics. The reduced wear associated with polymer cam followers also allows for the use of lighter weight rotating plates (such as those formed from aluminum), as opposed to metal cam followers, which generally require use of heavier materials (such as steel) for the rotating plates.

One case in point is skidding-related wear. Skidding occurs when the speed differential along the contact surfaces causes metal components to slide, accelerating the wear process, damaging equipment and leading to costly and often unanticipated downtime. For many manufacturers—especially those that produce parts in bulk—even small interruptions can have significant consequences, leading to missed shipping deadlines or a loss of customers. With traditional metal cam followers, the way to deal with skidding is through heavy lubrication of the contact surfaces—sometimes to the point of over-lubrication, which leads to additional challenges, such as contamination caused by stray lubricant. Not only that, but external lubrication systems are costly, labor-intensive and not sustainable. On the other hand, cam followers made from advanced polymers are intrinsically self-lubricating, successfully avoiding these pitfalls in many applications.

However, over time, friction-related temperature increases caused by skidding may cause wear damage even in the case of cam followers made from advanced polymers. The cam followers' surfaces may became rough. In time, the polymer may expand, and the radial component of the friction force may cause the outer racer to slip off the bearings.

With reference now specifically to FIG. 1, the problems caused by skidding are shown in more detail. Generally, said problems are the result of the inner and outer diameters of the cam follower running on different diameters of the turntable, generating heat, causing wear and shortening the cam follower's lifespan. In the example shown, a cam follower having a stationary cylindrical roller with a 1.75 inch diameter and a width of 1 inch is used to support a turntable having a diameter of 70 inches. Because the roller is cylindrical, it makes a line of contact with the turntable. Points 1 and 2 denote the contact line's two extremes. All the points along the contact line have equal linear velocities; this region between the two points is where skidding occurs.

As FIG. 1 shows, the roller is positioned such that Point 1 on the roller (i.e., the inner point disposed closer to the axis of rotation of the turntable) is positioned, in our example, under the turntable at a point where the turntable diameter is 61.67 inches, while Point 2 on the roller (i.e., the outer point disposed further from the axis of rotation of the turntable) is positioned under the turntable at a point where the turntable diameter is 63.67 inches. In our example, the cam followers are stationary, and the plate rotates.

To find the distance traveled by the roller at Point 1 for one revolution of the turntable, we calculate the number of revolutions made by the roller in one revolution of the turntable using the following formula:

$$N_{r1} \times d_r = N_t \times d_{t1}$$

where: $N_{r1}$ is the number of roller revolutions at Point 1 per turntable revolution, $d_r$ is the diameter of the roller, $N_t$ is the number of revolutions of the turntable and $d_{t1}$ is the diameter of the turntable at Point 1. Solving for $N_{r1}$ results in $N_{r1} = 35.239$ revolutions ≈ 35.2 revolutions.

Next, we can calculate the distance traveled by the roller at Point 1 in one revolution of the turntable, using the following formula:

$$L_1 = (N_{r1}) \cdot (\pi \cdot d_r)$$

where: $L_1$ is the distance the roller travels at Point 1 per turntable revolution, $N_{r1}$ is the number of roller revolutions at Point 1 per turntable revolution and $d_r$ is the diameter of the roller. Solving for $L_1$ results in $L_1 = 193.55$ inches.

The number of revolutions made at all contact points of the roller is the same, but the distance traveled at Point 2 of the table surface is different. Thus, we can calculate the distance the roller would travel at Point 2 for one revolution of the turntable if it were to rotate freely on the diameter ($d_{t2}$).

To find the distance traveled by the roller at Point 2 for one revolution of the turntable, we calculate the number of revolutions made by the roller in one revolution of the turntable using the following formula:

$$N_{r2} \times d_r = N_t \times d_{t2}$$

where: $N_{r2}$ is the number of roller revolutions at Point 2 per turntable revolution, $d_r$ is the diameter of the roller, $N_t$ is the number of revolutions of the turntable and $d_{t2}$ is the diameter of the turntable at Point 2. Solving for $N_{r2}$ results in $N_{r2}$=36.380 revolutions≈36.4 revolutions.

Next, we can calculate the distance traveled by the roller at Point 2 in one revolution of the turntable, using the following formula:

$$L_2 = (N_{r2}) \cdot (\pi \cdot d_r)$$

where: $L_2$ is the distance the roller travels at Point 2 per turntable revolution, $N_{r2}$ is the number of roller revolutions at Point 2 per turntable revolution and $d_r$ is the diameter of the roller. Solving for $L_2$ results in $L_2$=200.15 inches.

Because the distance values $L_1$ and $L_2$ are different for both points on the roller, we can conclude that skidding takes place between Points 1 and 2 to compensate. To find the skidding distance for one revolution of the turntable, we can use the following equation:

$L_s = L_2 - L_1 = 200.15$ inches $- 193.55$ inches $= 6.6$ inches where: $L_s$ is the amount of relative skidding between Points 1 and 2 per turntable revolution, $L_2$ is the distance the roller travels at Point 2 per turntable revolution and $L_1$ is the distance the roller travels at Point 1 per turntable revolution. Thus, the roller skids with respect to the surface of the turntable for a distance of 6.6 inches between Points 1 and 2 for every revolution of the turntable.

The typical turntable rotates for thousands of revolutions per hour, thereby exponentially increasing the overall skidding distance. Such skidding leads to wear and tear due to friction, lowering the roller's lifespan. Eventually, the skidding—and the damage caused thereby—renders the entire system inoperable, requiring the manufacturer to order new parts and stop production in order to replace the cam followers. This obviously drives costs up and wastes valuable time.

The present invention, therefore, aims to remedy these problems by minimizing, or even eliminating altogether, the amount of relative skidding between points on the cam follower and the surface of the turntable so as to reduce friction, while at the same time avoiding the problems associated with the traditional friction-reducing techniques involving the use (and often over-use) of lubricants.

SUMMARY OF THE INVENTION

In accordance with one aspect of the present invention, a rotating assembly comprises a plate rotatable about an axis of rotation and at least one cam follower positioned so as to contact and support a face of the rotatable plate. Each of the at least one cam follower comprises a common support shaft having a longitudinal axis disposed radially with respect to the axis of rotation of the rotatable plate and parallel to the face of the rotatable plate, a first roller assembly having a first outer tire portion with an outer periphery contacting the face of the rotatable plate and a first inner bearing portion rotatably mounting the first outer tire portion on the common support shaft such that the first outer tire portion rotates about the longitudinal axis of the common support shaft as the rotatable plate rotates and a second roller assembly having a second outer tire portion with an outer periphery contacting the face of the rotatable plate and a second inner bearing portion rotatably mounting the second outer tire portion on the support shaft such that the second outer tire portion rotates about the longitudinal axis of the common support shaft as the rotatable plate rotates. The first outer tire portion of the first roller assembly and the second outer tire portion of the second roller assembly are rotatable about the longitudinal axis of the common support shaft independently of one another. The first outer tire portion of the first roller assembly is positioned a first radial distance from the axis of rotation of the rotatable plate and the second outer tire portion of the second roller assembly is positioned a second radial distance from the axis of rotation of the rotatable plate, the second radial distance being different than the first radial distance, such that the first outer tire portion of the first roller assembly and the second outer tire portion of the second roller assembly rotate about the longitudinal axis of the common support shaft at different speeds as compared to one another as the rotatable plate rotates.

In some embodiments, the at least one cam follower comprises a plurality of cam followers. In certain of these embodiments, the at least one cam follower comprises three cam followers disposed 120 degrees apart from one another with respect to the axis of rotation of the rotatable plate. In certain embodiments, the at least one cam follower comprises four cam followers disposed 90 degrees apart from one another with respect to the axis of rotation of the rotatable plate. Additional cam followers can be provided to carry higher loads.

In some embodiments, the first outer tire portion of the first roller assembly and the second outer tire portion of the second roller assembly comprise crowned rollers having curved outer peripheries when viewed along any imaginary plane parallel to and passing through the longitudinal axis of the common support shaft. In certain of these embodiments, the outer peripheries of the first outer tire portion of the first roller assembly and the second outer tire portion of the second roller assembly are shaped as truncated spheres, spheroids or ellipsoids.

In some embodiments, the rotatable plate comprises a substantially flat, circular disk. In certain of these embodiments, the rotatable plate comprises a turntable.

In some embodiments, the first outer tire portion of the first roller assembly and the second outer tire portion of the second roller assembly are formed from a polymer material. In certain of these embodiments, the first outer tire portion of the first roller assembly and the second outer tire portion of the second roller assembly are formed from a polyimide material. In certain embodiments, the first outer tire portion of the first roller assembly and the second outer tire portion of the second roller assembly are formed from a material selected from the group consisting of a polyaryletherketone (PAEK) material, an acetal material, a cast nylon 12 material and a cast nylon 6 material.

In accordance with another aspect of the present invention, a turntable assembly comprises a substantially flat, circular disk rotatable about an axis of rotation and at least one cam follower positioned so as to contact and support a face of the rotatable disk. Each of the at least one cam follower comprises a common support shaft having a longitudinal axis disposed radially with respect to the axis of rotation of the rotatable disk and parallel to the face of the rotatable disk, a first roller assembly having a first outer tire portion with an outer periphery contacting the face of the rotatable disk and a first inner bearing portion rotatably mounting the first outer tire portion on the common support shaft such that the first outer tire portion rotates about the longitudinal axis of the common support shaft as the rotatable disk rotates, the first outer tire portion having a curved outer periphery when viewed along any imaginary plane parallel to and passing through the longitudinal axis of the common support shaft, and a second roller assembly having a second outer tire portion with an outer periphery contacting the face of the rotatable disk and a second inner bearing portion rotatably mounting the second outer tire portion on the support shaft such that the second outer tire portion rotates about the longitudinal axis of the common support shaft as the rotatable disk rotates, the second outer tire portion having a curved outer periphery when viewed along any imaginary plane parallel to and passing through the longitudinal axis of the common support shaft. The first outer tire portion of the first roller assembly and the second outer tire portion of the second roller assembly are rotatable about the longitudinal axis of the common support shaft independently of one another. The first outer tire portion of the first roller assembly and the second outer tire portion of the second roller assembly are formed from a polymer material. The first outer tire portion of the first roller assembly is positioned a first radial distance from the axis of rotation of the rotatable disk and the second outer tire portion of the second roller assembly is positioned a second radial distance from the axis of rotation of the rotatable disk, the second radial distance being different than the first radial distance, such that the first outer tire portion of the first roller assembly and the second outer tire portion of the second roller assembly rotate about the longitudinal axis of the common support shaft at different speeds as compared to one another as the rotatable disk rotates.

In some embodiments, the at least one cam follower comprises a plurality of cam followers. In certain of these embodiments, the at least one cam follower comprises three cam followers disposed 120 degrees apart from one another with respect to the axis of rotation of the rotatable disk. In certain embodiments, the at least one cam follower comprises four cam followers disposed 90 degrees apart from one another with respect to the axis of rotation of the rotatable disk.

In some embodiments, the outer peripheries of the first outer tire portion of the first roller assembly and the second outer tire portion of the second roller assembly are shaped as truncated spheres, spheroids or ellipsoids.

In some embodiments, the first outer tire portion of the first roller assembly and the second outer tire portion of the second roller assembly are formed from a polyimide material. In some embodiments, the first outer tire portion of the first roller assembly and the second outer tire portion of the second roller assembly are formed from a material selected from the group consisting of a polyaryletherketone (PAEK) material, an acetal material, a cast nylon 12 material and a cast nylon 6 material.

In accordance with a further aspect of the present invention, a cam follower is adapted for use in connection with a turntable assembly comprising a substantially flat, circular disk rotatable about an axis of rotation. The cam follower comprises a common support shaft having a longitudinal axis, a first roller assembly having a first outer tire portion with an outer periphery and a first inner bearing portion rotatably mounting the first outer tire portion on the common support shaft such that the first outer tire portion rotates about the longitudinal axis of the common support shaft, the first outer tire portion having a curved outer periphery when viewed along any imaginary plane parallel to and passing through the longitudinal axis of the common support shaft, and a second roller assembly having a second outer tire portion with an outer periphery and a second inner bearing portion rotatably mounting the second outer tire portion on the support shaft such that the second outer tire portion rotates about the longitudinal axis of the common support shaft, the second outer tire portion having a curved outer periphery when viewed along any imaginary plane parallel to and passing through the longitudinal axis of the common support shaft. The first outer tire portion of the first roller assembly and the second outer tire portion of the second roller assembly are rotatable about the longitudinal axis of the common support shaft independently of one another. The outer peripheries of the first outer tire portion of the first roller assembly and the second outer tire portion of the second roller assembly are shaped as truncated spheres, spheroids or ellipsoids, and the first outer tire portion of the first roller assembly and the second outer tire portion of the second roller assembly are formed from a material selected from the group consisting of a polyimide material, a polyaryletherketone (PAEK) material, an acetal material, a cast nylon 12 material and a cast nylon 6 material. The first outer tire portion of the first roller assembly is adapted to be positioned a first radial distance from the axis of rotation of the rotatable disk and the second outer tire portion of the second roller assembly is adapted to be positioned a second radial distance from the axis of rotation of the rotatable disk, the second radial distance being different than the first radial distance.

The present invention, therefore, provides a cam follower design wherein skidding between the cam follower rollers and the rotating plate is greatly reduced, or even eliminated altogether, as compared to traditional designs so as to reduce friction and the corresponding damage associated therewith and thereby extend the life of the cam follower, while at the same time avoiding the problems associated with the traditional friction-reducing techniques involving the use (and often over-use) of lubricants.

Other features and advantages of the invention will become more apparent from consideration of the following drawings.

DETAILED DESCRIPTION OF THE INVENTION

Figure 1:
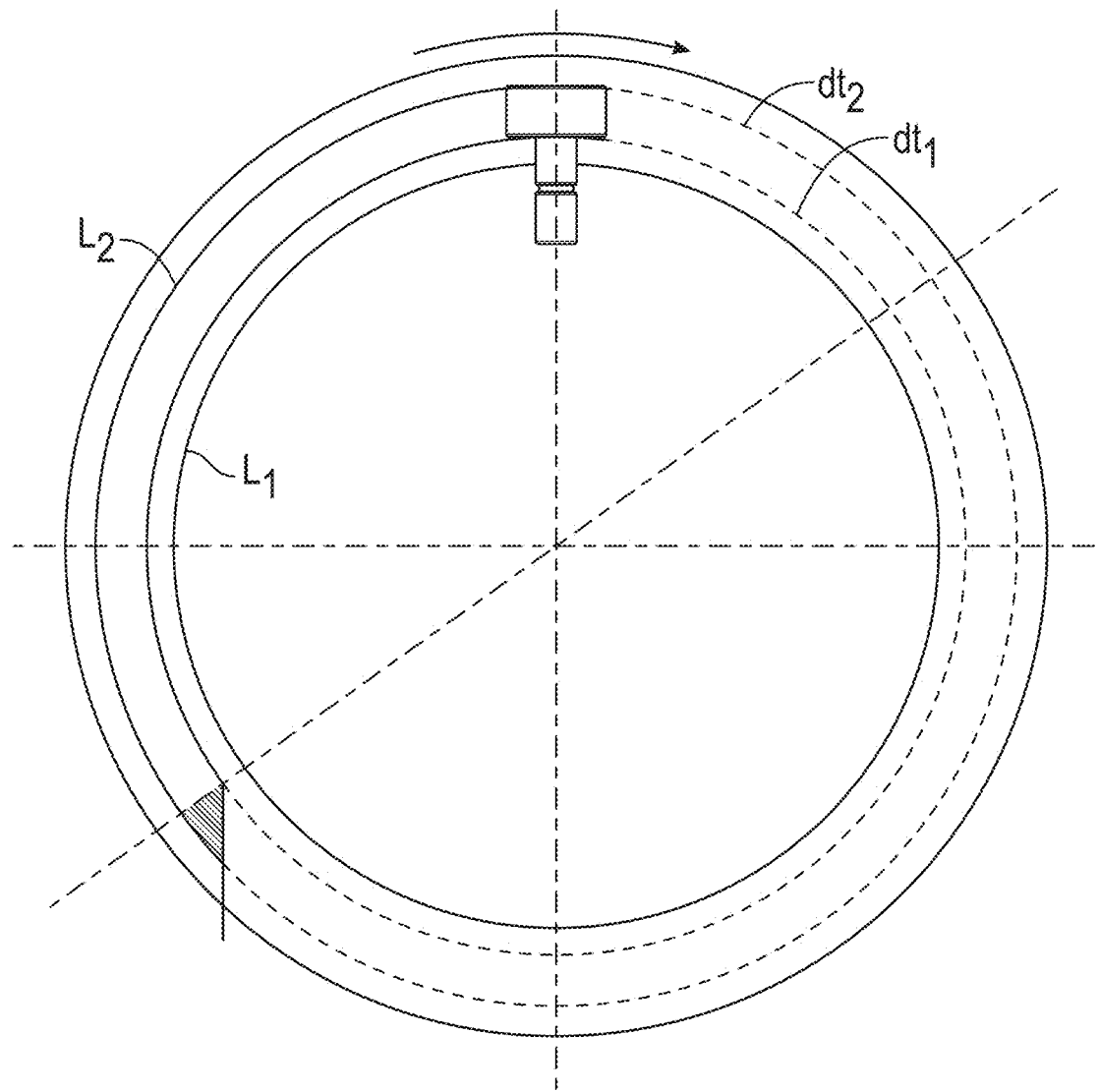
FIG. 1 is a basic schematic representation of a known turntable design incorporating a known cam follower design, and illustrating operation and disadvantages thereof.

The present invention may be further understood with reference to the following description and the appended drawings, wherein like elements are referred to with the same reference numerals. Exemplary embodiments of the present invention describe cam followers used to support generally horizontally disposed rotating plates, such as disk-shaped turntables. It should be understood, however, that the present invention may be implemented in any camming arrangement that utilizes a cam follower whose support shaft is arranged radially with respect to an axis of rotation of a rotating member supported by the cam follower. In addition to turntables, such rotating members may be found in machines utilizing cam followers rotating on a cam surface, such as liquid filling machines, can-making machines, necking machines, etc.

It should also be recognized that it is not necessary for the rotating plate to be disposed horizontally; indeed, it may be arranged vertically or at some other angle with respect to horizontal. Regardless of the angle of the plate, however, the longitudinal axis of the cam follower support shaft is generally disposed in a plane perpendicular to the axis of rotation of the rotating plate and radially with respect to an axis of rotation of a rotating plate.

Figure 2:
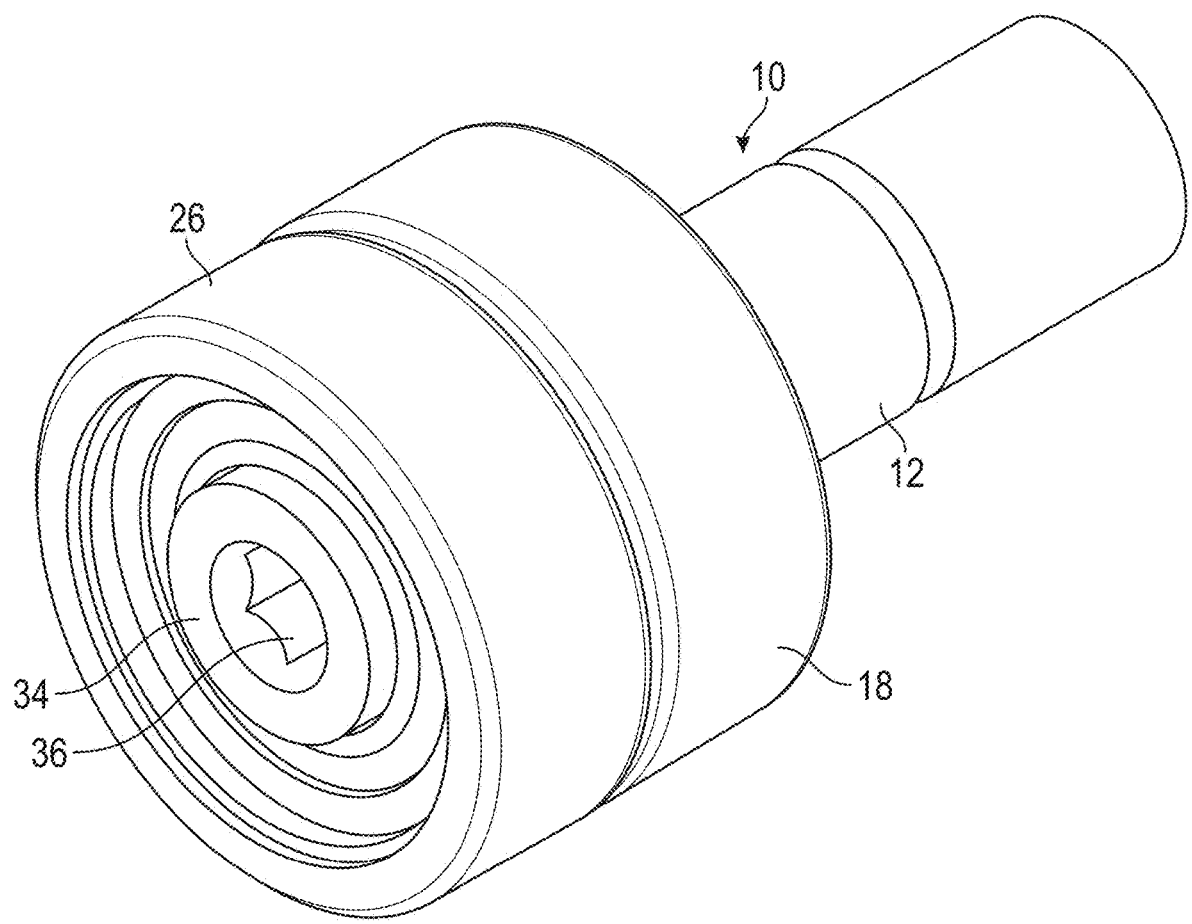
FIG. 2 is a side isometric view of a cam follower configured in accordance with an exemplary embodiment of the present invention.
Figure 3:
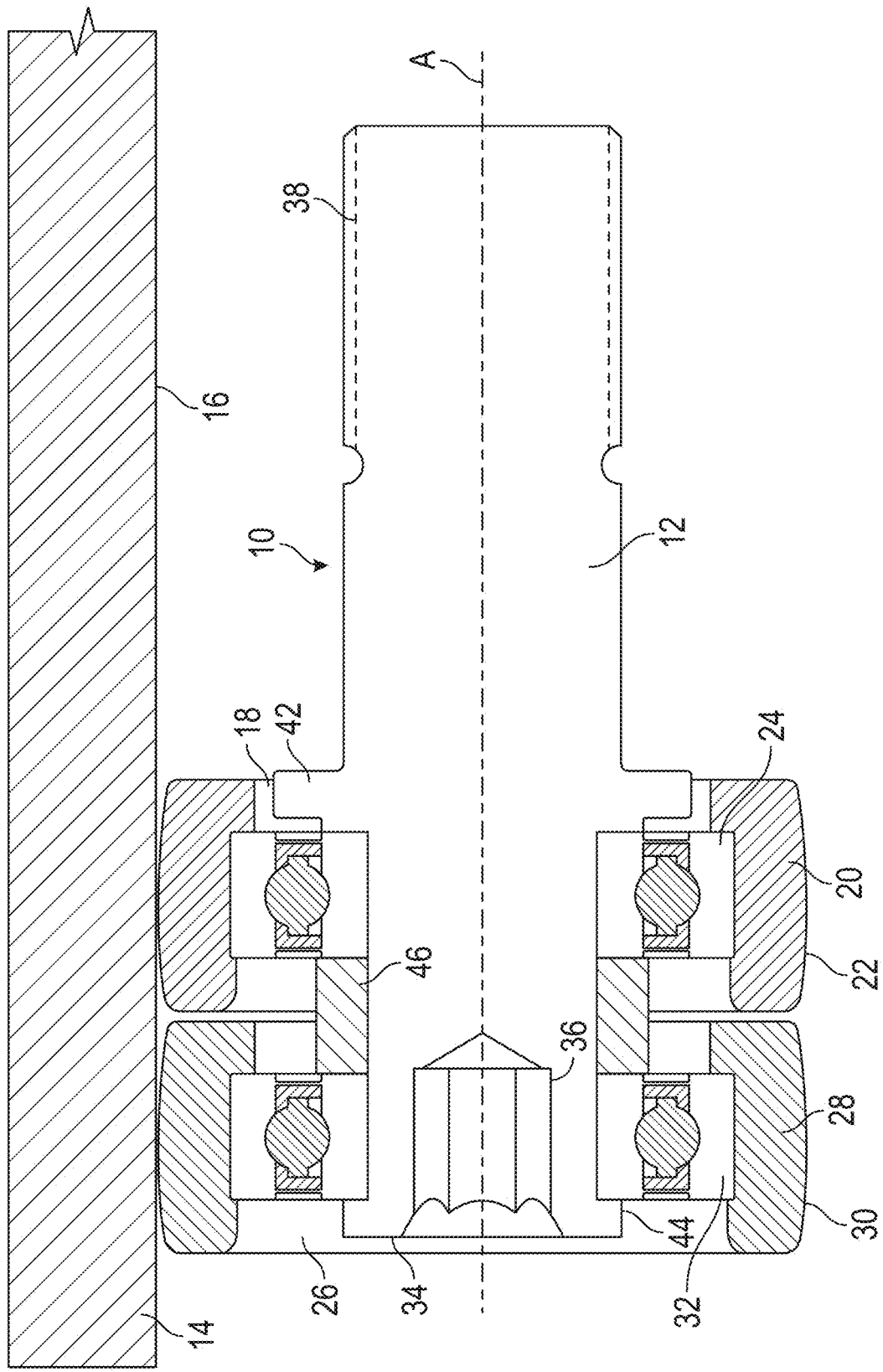
FIG. 3 is a side view, partially in cross-section, of the inventive cam follower shown in FIG. 2.
Figure 4:
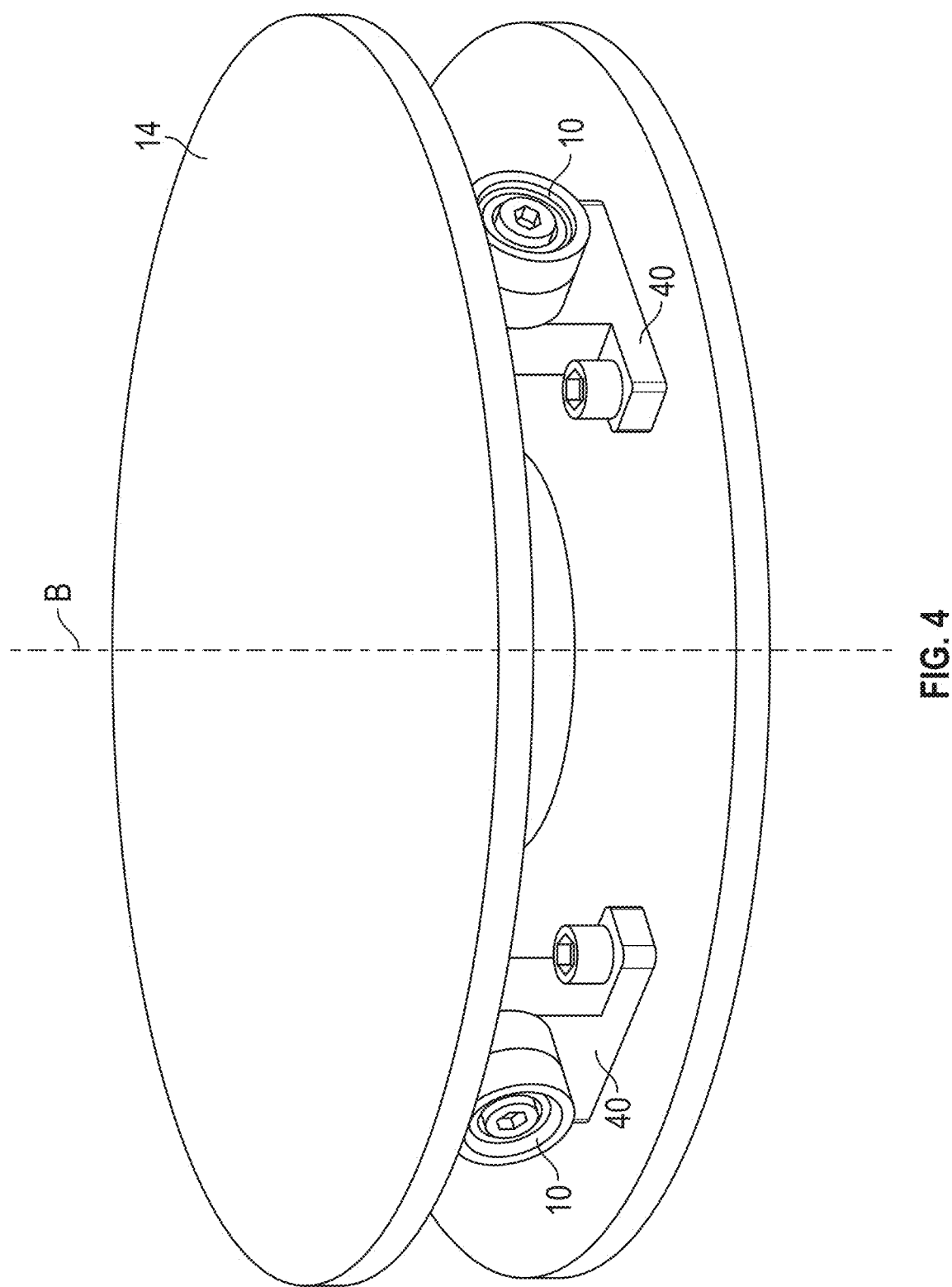
FIG. 4 is a side isometric view of an exemplary turntable incorporating cam followers configured in accordance with the present invention, as shown in FIG. 2.
Figure 5:
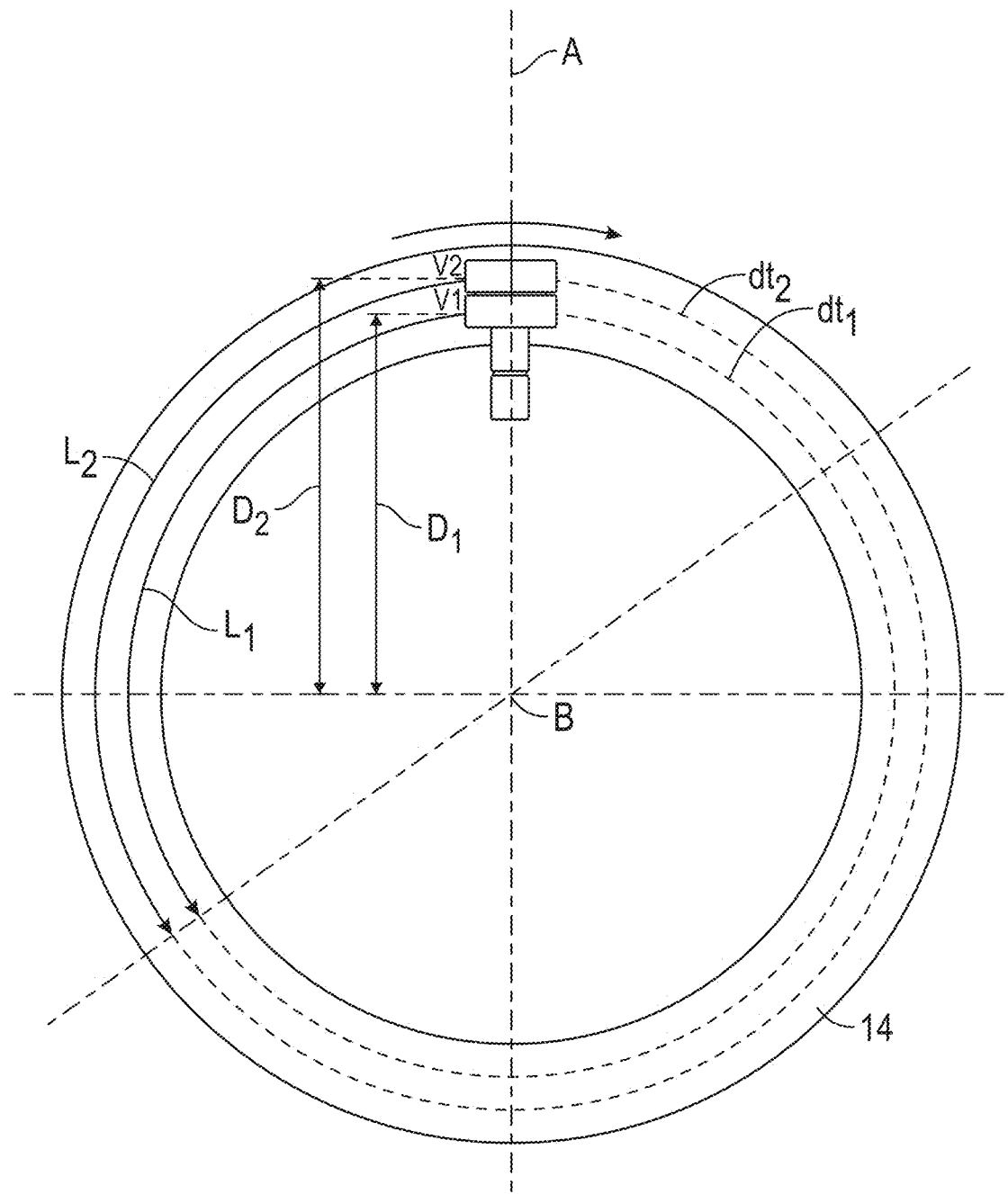
FIG. 5 is basic schematic representation of a turntable design incorporating the inventive cam followers of FIG. 2, and illustrating operation and advantages thereof.

FIGS. 2 and 3 generally illustrate a cam follower (10) configured in accordance with an exemplary embodiment of the present invention. The cam follower (10) includes a common support shaft (12) having a longitudinal axis (A) disposed radially with respect to an axis of rotation (B) of a rotatable plate (14) and parallel to a face (16) of the rotatable plate (14), as best seen in FIGS. 4 and 5. A first roller assembly (18) includes a first outer tire portion (20) with an outer periphery (22) contacting the face (16) of the rotatable plate (14) and a first inner bearing portion (24) rotatably mounting the first outer tire portion (20) on the common support shaft (12) such that the first outer tire portion (20) rotates about the longitudinal axis (A) of the common support shaft (12) as the rotatable plate (14) rotates. A second roller assembly (26) includes a second outer tire portion (28) with an outer periphery (30) contacting the face (16) of the rotatable plate (14) and a second inner bearing portion (32) rotatably mounting the second outer tire portion (28) on the support shaft (12) such that the second outer tire portion (28) rotates about the longitudinal axis (A) of the common support shaft (12) as the rotatable plate (14) rotates.

As best seen in FIG. 3, the common support shaft (12) includes a face (34) at the first axial end thereof perpendicular to the longitudinal axis (A) thereof. The face (34) has a recessed hexagonal socket (36) configured to receive a hex wrench, or the like, for rotating the common support shaft (12) about the longitudinal axis (A). The common support shaft (12) further includes a plurality of threads (38) on a radial outside surface of the shaft (12) at a second axial end thereof. In this way, the shaft (12) can be received in a bore of a mounting bracket (40; as seen in FIG. 4) or the like comprising a complementary thread pattern or can similarly be received in a nut or the like having a complementary thread pattern. If desired, the shaft (12) may optionally also include a hollow portion (not shown) to allow for weight reduction of the shaft (12) for efficiency of operation.

The first and second inner bearing portions (24, 32) are disposed over the first axial end of the shaft (12) such that the first and second outer tire portion (20, 28) are rotatable with respect to the shaft (12) via first and second inner bearing portions (24, 32). The first and second inner bearing portions (24, 32), and consequently the first and second outer tire portions (20, 28), may be axially retained on the shaft (12) by provision of a shoulder (42) on the shaft (12) which abuts the first inner bearing portion (24), and by another shoulder, flange, retaining clip or the like (44) abutting the second inner bearing portion (32). A spacer (46) disposed on the shaft (12) between the first and second inner bearing portions (24, 32) provides the proper spacing between the first and second roller assembly (18, 26) so as to ensure that the first and second outer tire portions (20, 28) do not rub against each other such that they remain freely rotatable with respect to the shaft (12) and with respect to one another.

Each of the first and second outer tire portions (20, 28) is configured as a crowned roller, such that the outer peripheries (22, 30) thereof have curved profiles when viewed along any imaginary plane parallel to and passing through the longitudinal axis (A) of the common support shaft (12), as is shown in the view of FIG. 3. The first and second outer tire portions (20, 28) may have any of various shapes, such as being shaped as truncated spheres, spheroids or ellipsoids. In the embodiment shown in FIG. 3, each of the first and second outer tire portions (20, 28) has a barrel-shaped profile, which may be defined as a truncated prolate spheroid, with circles of equal size on either end. The exact shape is not critical; what is desired, however, is for the first and second outer tire portions (20, 28) to have crowned profiles, such that each outer tire portion defined a generally single-point contact with the face (16) of the plate (14), as opposed to a line contact that would be defined if the outer tire portions had a generally cylindrical profile.

Each of the first and second outer tire portions (20, 28) is preferably formed from a polymer material. While many polymers may be used, it has been found that the use of polyimide materials, polyaryletherketone (PAEK) materials, acetal materials, cast nylon 12 materials and cast nylon 6 materials provides multiple advantages, including the following: no lubrication is required on the rotating plate or the bearings (bearings are lubricated for life); there is no rotating plate wear, which results in substantial savings on replacing worn-out plates and also allows for lighter weight plates, such as aluminum plates, to be used instead of the traditional steel plates; with a polymer outer tire portion, there is no grease and metal particulate contamination; a polymer outer tire portion reduces noise, as compared to metal cam followers; and a polymer outer tire portion allows for a reduced weight, as compared to metal cam followers.

As best seen in FIG. 5, the first outer tire portion (20) of the first roller assembly (18) is positioned a first radial distance ($D_1$) from the axis of rotation (B) of the rotatable plate (14) and the second outer tire portion (28) of the second roller assembly (26) is positioned a second radial distance ($D_2$) from the axis of rotation (B) of the rotatable plate (14). As can be seen, the second radial distance ($D_2$) is different than the first radial distance ($D_1$); in the specific example illustrated, the first radial distance ($D_1$) is 30.99 inches (i.e., half of the 61.98 inch diameter), while the second radial distance ($D_2$) is 31.675 inches (i.e., half of the 63.35 inch diameter). Since the first and second outer tire portions (20, 28) have crowned profiles, only a single point of contact with the face (16) of the rotating plate (14) is illustrated.

In view of the fact that the first outer tire portion (20) of the first roller assembly (18) and the second outer tire portion (28) of the second roller assembly (26) are freely rotatable with respect to each other, and the fact that they contact the face (16) of the rotatable plate (14) at different distances with respect to the axis of rotation (B) of the plate (14), the first and second outer tire portions (20, 28) rotate about the longitudinal axis (A) of the common support shaft (12) at different speeds as compared to one another as the rotatable plate (14) rotates.

Turning now to FIG. 5, a quantitative analysis of a two-roller design in accordance with the present invention is schematically illustrated.

To find the distance travelled by the first outer tire portion (20) of the first roller assembly (18) for one revolution of the rotatable plate (14), we first find the number of revolutions made by the first outer tire portion (20) in one revolution of the rotating plate (14) using the following formula:

$$N_{r1} \times d_r = N_t \times d_{t1}$$

where: $N_{r1}$ is the number of revolutions of the first outer tire portion (20) per revolution of the rotating plate (14), $d_r$ is the diameter of the first outer tire portion (20), $N_t$ is the number of revolutions of the rotating plate (14) and $d_{t1}$ is the diameter of the rotating plate (14) where the first outer tire portion (20) makes contact therewith. Solving for $N_{r1}$ results in $N_{r1}$=35.4 revolutions.

Next, we can calculate the distance traveled by the first outer tire portion (20) in one revolution of the rotating plate (14), using the following formula:

$$L_1 = (N_{r1}) \cdot (\pi \cdot d_r)$$

where: $L_1$ is the distance the travelled by the first outer tire portion (20) per revolution of the plate (14), $N_{r1}$ is the number of revolutions of the first outer tire portion (20) per revolution of the plate (14) and $d_r$=the diameter of the first outer tire portion (20). Solving for $L_1$ results in $L_1$=194.523 inches.

To find the distance travelled by the second outer tire portion (28) of the second roller assembly (26) for one revolution of the rotatable plate (14), we first find the number of revolutions made by the second outer tire portion (28) in one revolution of the rotating plate (14) using the following formula:

$$N_{r2} \times d_r = N_t \times d_{t2}$$

where: $N_{r2}$ is the number of revolutions of the second outer tire portion (28) per revolution of the rotating plate (14), $d_r$ is the diameter of the second outer tire portion (28), $N_t$ is the number of revolutions of the rotating plate (14) and $d_{t2}$ is the diameter of the rotating plate (14) where the second outer tire portion (28) makes contact therewith. Solving for $N_{r2}$ results in $N_{r2}$=36.2 revolutions.

Next, we can calculate the distance traveled by the second outer tire portion (28) in one revolution of the rotating plate (14), using the following formula:

$$L_2 = (N_{r2}) \cdot (\pi \cdot d_r)$$

where: $L_2$ is the distance the travelled by the second outer tire portion (28) per revolution of the plate (14), $N_{r2}$ is the number of revolutions of the second outer tire portion (28) per revolution of the plate (14) and $d_r$ is the diameter of the second outer tire portion (28). Solving for $L_2$ results in $L_2$=198.919 inches.

Comparing the above calculations for the first and second outer tire portions (20, 28) it is observed that the first outer tire portion (20) rotates slower than does the second outer tire portion (28)—i.e., 35.4 revolutions versus 36.2 revolutions per revolution of the plate (14)—and also that the distance travelled by the first outer tire portion (20) is shorter than the distance travelled by the second outer tire portion (28)—i.e., 194.523 inches versus 198.919 inches per revolution of the plate (14).

In the prior art model using the single-roller cylindrical-profile design (as shown in FIG. 1 and discussed above), all points on the roller were forced to travel at the same constant speed, causing the roller to skid with respect to the face of the rotatable plate a maximum distance of 6.6 inches per revolution of the plate. Using two rollers, however, allows both to rotate independently with different velocities and also travel different distances to cover the same angle turned by the rotatable plate. Thus, there is reduced skidding. The crowned design provides for a point contact, and this outcome relieves friction-related stresses on the cam followers even more by virtually eliminating skidding altogether, thereby reducing wear and tear, and improving the lifespans of the various components.

As noted above, while the illustrated exemplary embodiment illustrates use of the inventive cam followers in connection with a turntable, it should be understood that the present invention may be implemented in any camming arrangement that utilizes a cam follower whose support shaft is arranged radially with respect to an axis of rotation of a rotating member supported by the cam follower. In addition to turntables, such rotating members may be found in liquid filling machines, can-making machines, necking machines, etc.

It should also be recognized that while each cam follower is shown to have two roller assemblies, and while two roller assemblies are described in connection with the exemplary embodiment, each cam follower may have additional independently rotatable roller assemblies (e.g., three, four or even more) carried on the same common support shaft, as may be appropriate for the situation.

Figure 6A:
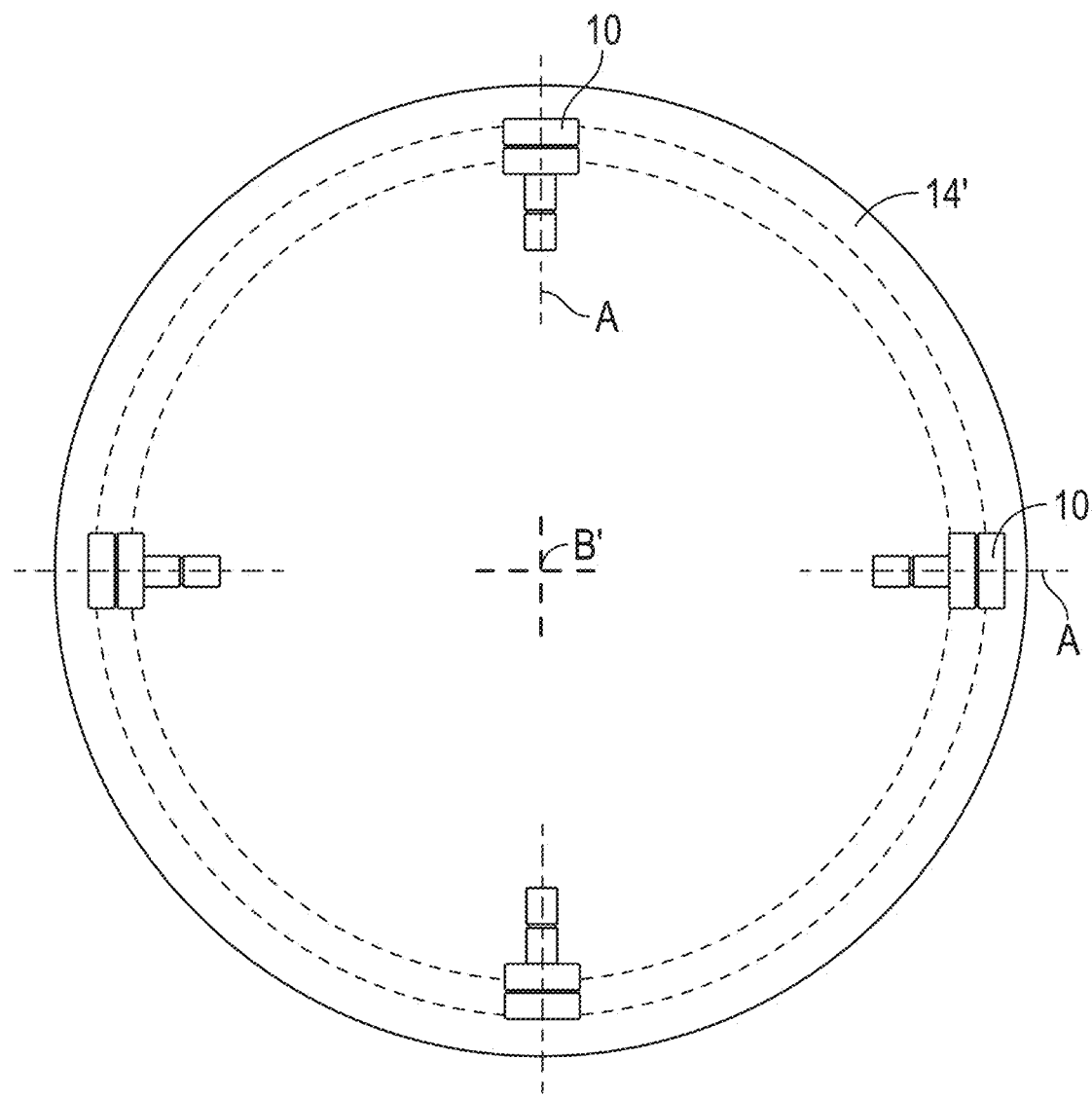
FIGS. 6A and 6B are top schematic views of turntables incorporating different numbers of the inventive cam follower of FIG. 2.
Figure 6B:
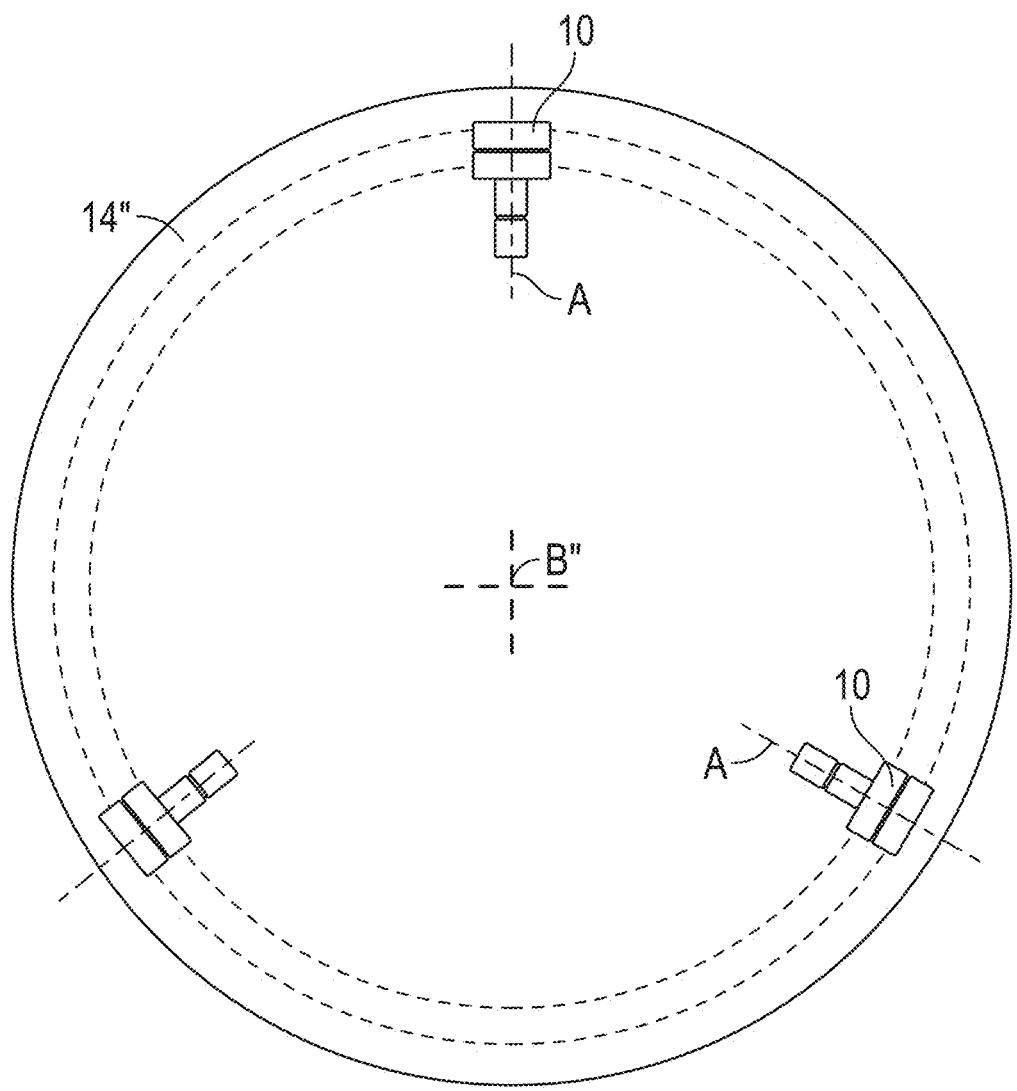

Also, it should be recognized that each rotatable plate may be supported by a plurality of cam followers (10) configured in accordance with the present invention. For example, FIG. 6A illustrates a rotating plate (14') supported by four cam followers (10) disposed 90 degrees apart from one another with respect to the axis of rotation (B') of the rotatable plate (14'), while FIG. 6B illustrates a rotating plate (14") supported by three cam followers (10) disposed 120 degrees apart from one another with respect to the axis of rotation (B") of the rotatable plate (14"). However, it is also contemplated that fewer than three or more than four cam followers may be employed instead.

In view of the above, it will be recognized that the present invention provides a cam follower design wherein skidding between the cam follower rollers and the rotating plate is greatly reduced, or even eliminated altogether, as compared to traditional designs so as to reduce friction and the corresponding damage associated therewith and thereby extend the life of the cam follower, while at the same time avoiding the problems associated with the traditional friction-reducing techniques involving the use (and often overuse) of lubricants.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A rotating assembly comprising a plate rotatable about an axis of rotation and at least one cam follower positioned so as to contact and support a face of said rotatable plate, each of said at least one cam follower comprising:
   a common support shaft having a longitudinal axis disposed radially with respect to the axis of rotation of said rotatable plate and parallel to the face of said rotatable plate;
   a first roller assembly having a first outer tire portion with an outer periphery contacting the face of said rotatable plate and a first inner bearing portion rotatably mounting the first outer tire portion on said common support shaft such that the first outer tire portion rotates about the longitudinal axis of said common support shaft as said rotatable plate rotates;

a second roller assembly having a second outer tire portion with an outer periphery contacting the face of said rotatable plate and a second inner bearing portion rotatably mounting the second outer tire portion on said support shaft such that the second outer tire portion rotates about the longitudinal axis of said common support shaft as said rotatable plate rotates;

wherein the first outer tire portion of said first roller assembly and the second outer tire portion of said second roller assembly are rotatable about the longitudinal axis of said common support shaft independently of one another;

wherein the first outer tire portion of said first roller assembly is positioned a first radial distance from the axis of rotation of said rotatable plate and wherein the second outer tire portion of said second roller assembly is positioned a second radial distance from the axis of rotation of said rotatable plate, said second radial distance being different than said first radial distance; and wherein the first outer tire portion of said first roller assembly and the second outer tire portion of said second roller assembly rotate about the longitudinal axis of said common support shaft at different speeds as compared to one another as said rotatable plate rotates.

2. The rotating assembly of claim 1 wherein said at least one cam follower comprises a plurality of cam followers.

3. The rotating assembly of claim 2 wherein said at least one cam follower comprises three cam followers disposed 120 degrees apart from one another with respect to the axis of rotation of said rotatable plate.

4. The rotating assembly of claim 2 wherein said at least one cam follower comprises four cam followers disposed 90 degrees apart from one another with respect to the axis of rotation of said rotatable plate.

5. The rotating assembly of claim 1 wherein the first outer tire portion of said first roller assembly and the second outer tire portion of said second roller assembly comprise crowned rollers having curved outer peripheries when viewed along any imaginary plane parallel to and passing through the longitudinal axis of said common support shaft.

6. The rotating assembly of claim 5 wherein the outer peripheries of the first outer tire portion of said first roller assembly and the second outer tire portion of said second roller assembly are shaped as truncated spheres, spheroids or ellipsoids.

7. The rotating assembly of claim 1 wherein said rotatable plate comprises a substantially flat, circular disk.

8. The rotating assembly of claim 7 wherein said rotatable plate comprises a turntable.

9. The rotating assembly of claim 1 wherein the first outer tire portion of said first roller assembly and the second outer tire portion of said second roller assembly are formed from a polymer material.

10. The rotating assembly of claim 9 wherein the first outer tire portion of said first roller assembly and the second outer tire portion of said second roller assembly are formed from a polyimide material.

11. The rotating assembly of claim 9 wherein the first outer tire portion of said first roller assembly and the second outer tire portion of said second roller assembly are formed from a material selected from the group consisting of a polyaryletherketone (PAEK) material, an acetal material, a cast nylon 12 material and a cast nylon 6 material.

12. A turntable assembly comprising a substantially flat, circular disk rotatable about an axis of rotation and at least one cam follower positioned so as to contact and support a face of said rotatable disk, each of said at least one cam follower comprising:

a common support shaft having a longitudinal axis disposed radially with respect to the axis of rotation of said rotatable disk and parallel to the face of said rotatable disk;

a first roller assembly having a first outer tire portion with an outer periphery contacting the face of said rotatable disk and a first inner bearing portion rotatably mounting the first outer tire portion on said common support shaft such that the first outer tire portion rotates about the longitudinal axis of said common support shaft as said rotatable disk rotates, the first outer tire portion having a curved outer periphery when viewed along any imaginary plane parallel to and passing through the longitudinal axis of said common support shaft;

a second roller assembly having a second outer tire portion with an outer periphery contacting the face of said rotatable disk and a second inner bearing portion rotatably mounting the second outer tire portion on said support shaft such that the second outer tire portion rotates about the longitudinal axis of said common support shaft as said rotatable disk rotates, the second outer tire portion having a curved outer periphery when viewed along any imaginary plane parallel to and passing through the longitudinal axis of said common support shaft;

wherein the first outer tire portion of said first roller assembly and the second outer tire portion of said second roller assembly are rotatable about the longitudinal axis of said common support shaft independently of one another;

wherein the first outer tire portion of said first roller assembly and the second outer tire portion of said second roller assembly are formed from a polymer material;

wherein the first outer tire portion of said first roller assembly is positioned a first radial distance from the axis of rotation of said rotatable disk and wherein the second outer tire portion of said second roller assembly is positioned a second radial distance from the axis of rotation of said rotatable disk, said second radial distance being different than said first radial distance; and wherein the first outer tire portion of said first roller assembly and the second outer tire portion of said second roller assembly rotate about the longitudinal axis of said common support shaft at different speeds as compared to one another as said rotatable disk rotates.

13. The rotating assembly of claim 12 wherein said at least one cam follower comprises a plurality of cam followers.

14. The rotating assembly of claim 13 wherein said at least one cam follower comprises three cam followers disposed 120 degrees apart from one another with respect to the axis of rotation of said rotatable disk.

15. The rotating assembly of claim 13 wherein said at least one cam follower comprises four cam followers disposed 90 degrees apart from one another with respect to the axis of rotation of said rotatable disk.

16. The rotating assembly of claim 12 wherein the outer peripheries of the first outer tire portion of said first roller assembly and the second outer tire portion of said second roller assembly are shaped as truncated spheres, spheroids or ellipsoids.

17. The rotating assembly of claim 12 wherein the first outer tire portion of said first roller assembly and the second outer tire portion of said second roller assembly are formed from a polyimide material.

18. The rotating assembly of claim 12 wherein the first outer tire portion of said first roller assembly and the second outer tire portion of said second roller assembly are formed from a material selected from the group consisting of a polyaryletherketone (PAEK) material, an acetal material, a cast nylon 12 material and a cast nylon 6 material.

19. A cam follower adapted for use in connection with a turntable assembly comprising a substantially flat, circular disk rotatable about an axis of rotation, said cam follower comprising:
   a common support shaft having a longitudinal axis;
   a first roller assembly having a first outer tire portion with an outer periphery and a first inner bearing portion rotatably mounting the first outer tire portion on said common support shaft such that the first outer tire portion rotates about the longitudinal axis of said common support shaft, the first outer tire portion having a curved outer periphery when viewed along any imaginary plane parallel to and passing through the longitudinal axis of said common support shaft;
   a second roller assembly having a second outer tire portion with an outer periphery and a second inner bearing portion rotatably mounting the second outer tire portion on said support shaft such that the second outer tire portion rotates about the longitudinal axis of said common support shaft, the second outer tire portion having a curved outer periphery when viewed along any imaginary plane parallel to and passing through the longitudinal axis of said common support shaft;
   wherein the first outer tire portion of said first roller assembly and the second outer tire portion of said second roller assembly are rotatable about the longitudinal axis of said common support shaft independently of one another;
   wherein the outer peripheries of the first outer tire portion of said first roller assembly and the second outer tire portion of said second roller assembly are shaped as truncated spheres, spheroids or ellipsoids;
   wherein the first outer tire portion of said first roller assembly and the second outer tire portion of said second roller assembly are formed from a material selected from the group consisting of a polyimide material, a polyaryletherketone (PAEK) material, an acetal material, a cast nylon 12 material and a cast nylon 6 material;
   wherein the first outer tire portion of said first roller assembly is adapted to be positioned a first radial distance from the axis of rotation of the rotatable disk and wherein the second outer tire portion of said second roller assembly is adapted to be positioned a second radial distance from the axis of rotation of the rotatable disk, said second radial distance being different than said first radial distance; and
   wherein the first outer tire portion of said first roller assembly and the second outer tire portion of said second roller assembly are adapted to rotate about the longitudinal axis of said common support shaft at different speeds as compared to one another as said rotatable disk rotates.

\* \* \* \* \*